US012598060B2

(12) United States Patent
Kennedy et al.

(10) Patent No.: US 12,598,060 B2
(45) Date of Patent: Apr. 7, 2026

(54) DISTRIBUTED ENCRYPTION KEY ALLOCATION

(71) Applicant: Zoom Communications, Inc., San Jose, CA (US)

(72) Inventors: John Kennedy, Los Olivos, CA (US); Prasanna Kumar Malaiyandi, Santa Clara, CA (US); Karthik Raman, New York, NY (US); Jan Zila, Seattle, WA (US)

(73) Assignee: Zoom Communications, Inc., San Jose, CA (US)

( * ) Notice: Subject to any disclaimer, the term of this patent is extended or adjusted under 35 U.S.C. 154(b) by 477 days.

(21) Appl. No.: 17/472,644

(22) Filed: Sep. 12, 2021

(65) Prior Publication Data

US 2023/0078187 A1     Mar. 16, 2023

(51) Int. Cl.
*H04L 9/08*          (2006.01)
*H04L 9/40*          (2022.01)

(52) U.S. Cl.
CPC ............ *H04L 9/0827* (2013.01); *H04L 9/083* (2013.01); *H04L 9/0833* (2013.01); *H04L 9/0894* (2013.01); *H04L 63/062* (2013.01); *H04L 63/065* (2013.01)

(58) Field of Classification Search
CPC ..... H04L 9/0827; H04L 9/083; H04L 9/0833; H04L 9/0894; H04L 63/065; H04L 63/062
See application file for complete search history.

(56) References Cited

U.S. PATENT DOCUMENTS

| | | | |
|---|---|---|---|
| 11,799,633 B1 | 10/2023 | Cartagena et al. | |
| 12,143,475 B2 | 11/2024 | Cartagena et al. | |
| 12,238,078 B2 | 2/2025 | Kaciulis | |
| 2008/0297586 A1* | 12/2008 | Kurtz .................. | H04L 12/1827 |
| | | | 348/E7.083 |
| 2010/0128875 A1* | 5/2010 | Rosini .................. | H04L 63/061 |
| | | | 379/67.1 |
| 2012/0008753 A1* | 1/2012 | Burnett .................. | H04L 51/56 |
| | | | 379/90.01 |
| 2014/0129831 A1* | 5/2014 | Odinak .................. | H04L 9/0894 |
| | | | 713/165 |

(Continued)

FOREIGN PATENT DOCUMENTS

| | | |
|---|---|---|
| CN | 110061957 A | 7/2019 |
| WO | 2019227557 A1 | 12/2019 |

OTHER PUBLICATIONS

Your guide to Enterprise Key Management at Slack, https://slack.com, Sep. 1, 2021, 4 pages.

(Continued)

*Primary Examiner* — Nam T Tran
(74) *Attorney, Agent, or Firm* — Young Basile Hanlon & MacFarlane, P.C.

(57) ABSTRACT

Customers of a software platform, such as a unified communications as a service platform, are enabled to control their own encryption keys used to encrypt and decrypt data from various communication services in the software platform. A key broker server is employed to map encryption and decryption requests from servers in the platform to key management servers of customers based on user identifiers. Examples of data encrypted may includes conference recordings, webinar recordings, phone call recordings, voicemails, emails, and calendar tokens.

20 Claims, 12 Drawing Sheets

(56) References Cited

U.S. PATENT DOCUMENTS

| | | | |
|---|---|---|---|
| 2014/0229737 A1* | 8/2014 | Roth | H04L 9/0891 |
| | | | 713/176 |
| 2014/0229739 A1 | 8/2014 | Roth et al. | |
| 2018/0048464 A1* | 2/2018 | Lim | H04L 63/062 |
| 2018/0109508 A1 | 4/2018 | Wall et al. | |
| 2018/0268159 A1 | 9/2018 | Yu | |
| 2018/0309734 A1 | 10/2018 | Yu et al. | |
| 2019/0342079 A1 | 11/2019 | Rudzitis et al. | |
| 2020/0053065 A1 | 2/2020 | Wisniewski et al. | |
| 2020/0258050 A1* | 8/2020 | Wang | H04L 9/3228 |
| 2021/0377016 A1 | 12/2021 | Perlman et al. | |
| 2021/0385070 A1 | 12/2021 | Watson et al. | |
| 2022/0179972 A1* | 6/2022 | Sah | H04L 9/0822 |
| 2022/0239655 A1* | 7/2022 | Viswanathan Iyer | |
| | | | H04L 63/083 |
| 2022/0391494 A1 | 12/2022 | Yang et al. | |

OTHER PUBLICATIONS

Use envelope encryption with customer master keys—Financial Services Industry Lens, https://docs.aws.amazon.com/wellarchitected/ latest/financial-services-industry-lens/use-envelope-encrytpion-with-customer-master-keys.html., Sep. 1, 2021, 1 page.

Google will let enterprises store their Google Workspace encryption keys, TechCrunch, https://techcrunch.com/2021/06/14/google-workspace-encryption-keys/., Zach Whittaker, Jun. 14, 2021, 9 pages.

Deployment Guide for Cisco Webex Hybrid Data Security— Getting Started with Hybrid Data Security, Cisco Webex Teams, Cisco, https://www.cisco.com., Jun. 24, 2021, 8 pages.

Key Management Service, Amazon Web Services (AWS), https:// aws.amazon.com/kms/., Aug. 31, 2021, 7 pages.

International Search Report and Written Opinion mailed on Dec. 12, 2022 in corresponding PCT Application No. PCT/US2022/043060.

Anonymous: "AWS Key Management Service—Developer Guide", Nov. 25, 2019 (Nov. 25, 2019), XP055693941, Retrieved from the Internet: URL: https://docs.aws.amazon.com/kms/latest/developerguide/ kms-dg.pdf#programming-aliases [retrieved on May 12, 2020] p. 5-p. 7.

Ryan Kurte; A Distributed Service Framework for the Internet of Things; IEEE: 2020; pp. 4166-4176.

* cited by examiner

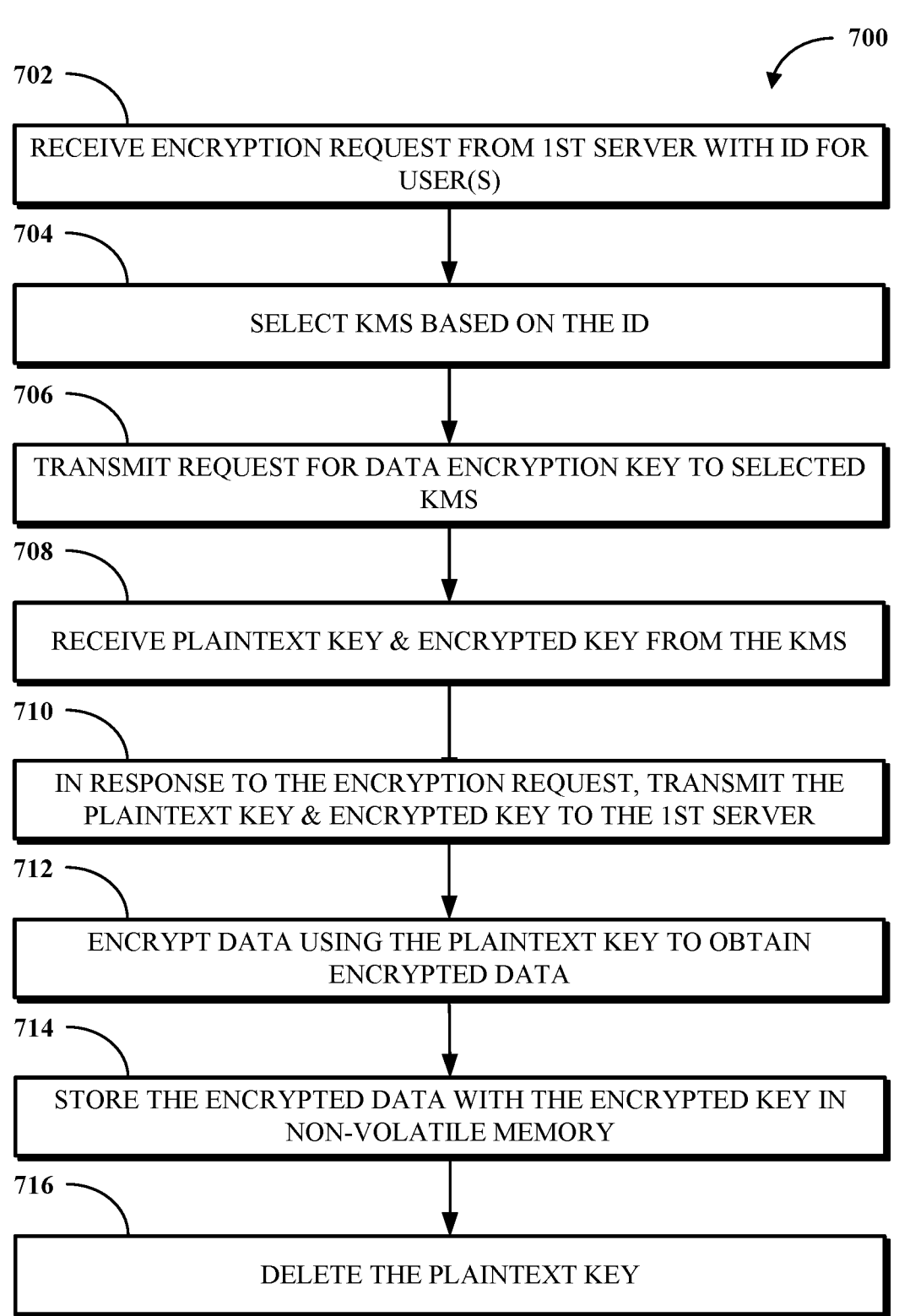

702 — RECEIVE ENCRYPTION REQUEST FROM 1ST SERVER WITH ID FOR USER(S)

704 — SELECT KMS BASED ON THE ID

706 — TRANSMIT REQUEST FOR DATA ENCRYPTION KEY TO SELECTED KMS

708 — RECEIVE PLAINTEXT KEY & ENCRYPTED KEY FROM THE KMS

710 — IN RESPONSE TO THE ENCRYPTION REQUEST, TRANSMIT THE PLAINTEXT KEY & ENCRYPTED KEY TO THE 1ST SERVER

712 — ENCRYPT DATA USING THE PLAINTEXT KEY TO OBTAIN ENCRYPTED DATA

714 — STORE THE ENCRYPTED DATA WITH THE ENCRYPTED KEY IN NON-VOLATILE MEMORY

716 — DELETE THE PLAINTEXT KEY

FIG. 7

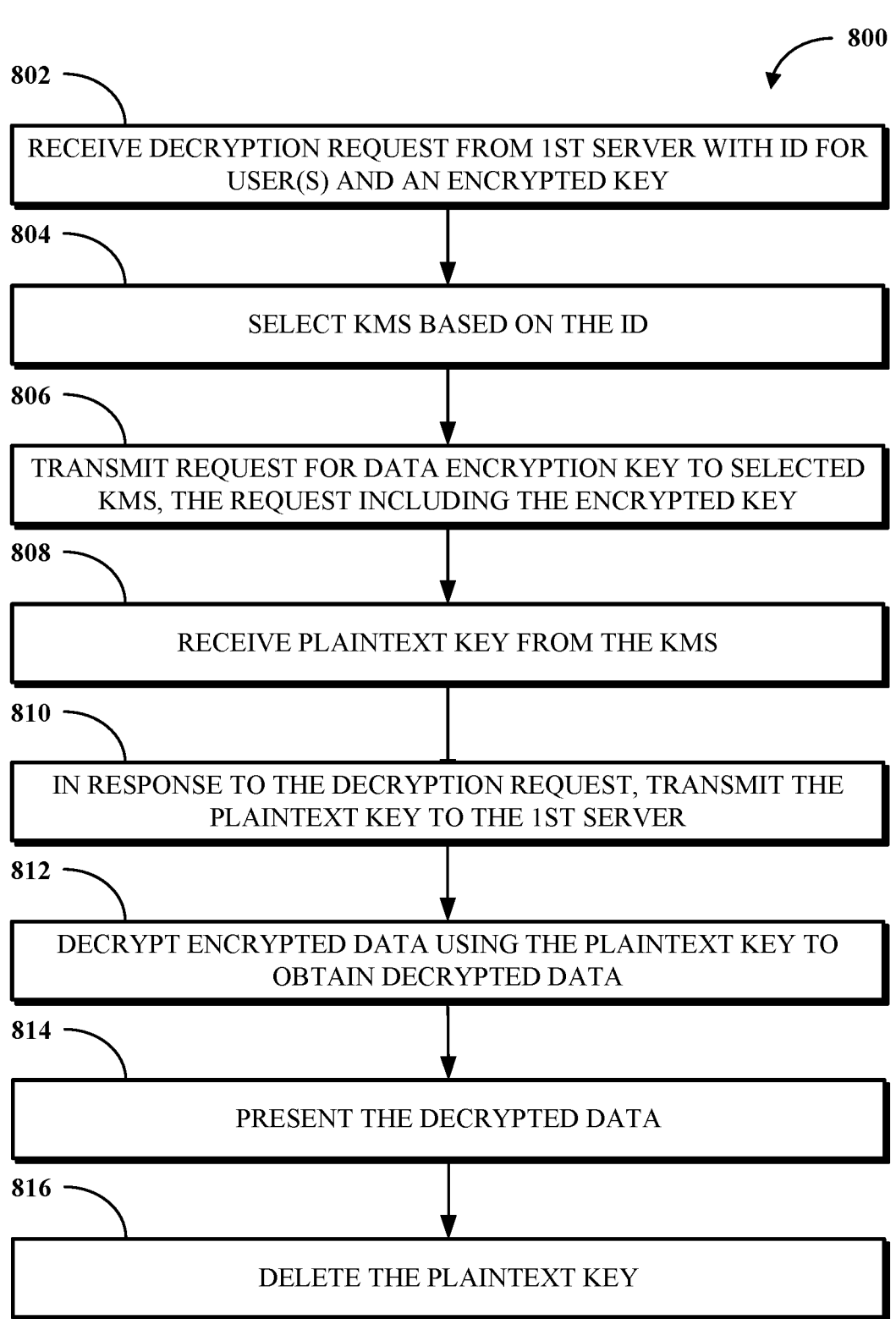

800

802

RECEIVE DECRYPTION REQUEST FROM 1ST SERVER WITH ID FOR USER(S) AND AN ENCRYPTED KEY

804

SELECT KMS BASED ON THE ID

806

TRANSMIT REQUEST FOR DATA ENCRYPTION KEY TO SELECTED KMS, THE REQUEST INCLUDING THE ENCRYPTED KEY

808

RECEIVE PLAINTEXT KEY FROM THE KMS

810

IN RESPONSE TO THE DECRYPTION REQUEST, TRANSMIT THE PLAINTEXT KEY TO THE 1ST SERVER

812

DECRYPT ENCRYPTED DATA USING THE PLAINTEXT KEY TO OBTAIN DECRYPTED DATA

814

PRESENT THE DECRYPTED DATA

816

DELETE THE PLAINTEXT KEY

FIG. 8

902 — RECEIVE ENCRYPTION ALGORITHM ID FROM KMS

904 — SELECT ENCRYPTION ALGORITHM TO BE APPLIED WITH THE PLAINTEXT KEY BASED ON THE ENCRYPTION ALGORITHM ID

906 — RECEIVE DESTINATION ADDRESS FROM THE KMS

908 — STORE THE ENCRYPTED KEY & THE ENCRYPTED DATA IN NON-VOLATILE MEMORY AT THE DESTINATION ADDRESS

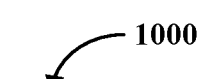
1000
1002
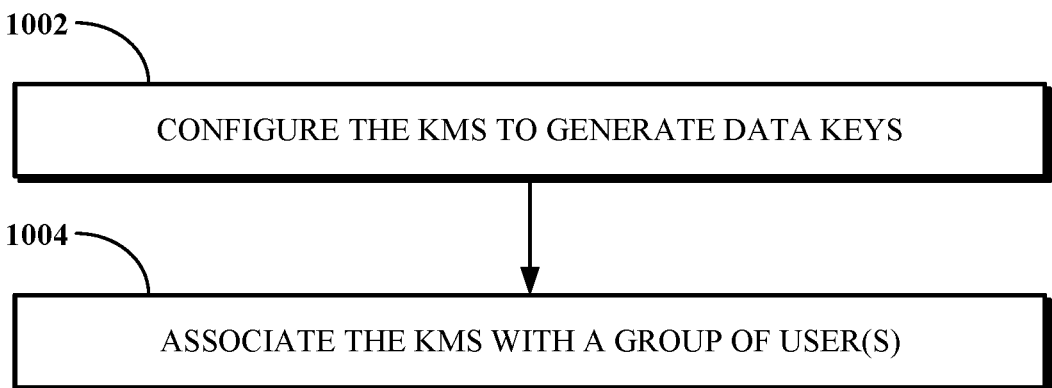
CONFIGURE THE KMS TO GENERATE DATA KEYS
1004
ASSOCIATE THE KMS WITH A GROUP OF USER(S)
FIG. 10

1100

1102

SELECT THE KMS BASED ON AN INDICATION, INCLUDED IN THE ENCRYPTION REQUEST, OF A TYPE OF DATA TO BE ENCRYPTED

1104

SELECT THE KMS BASED ON AN INDICATION, INCLUDED IN THE ENCRYPTION REQUEST, OF A GEOGRAPHIC REGION ASSOCIATED WITH DATA TO BE ENCRYPTED

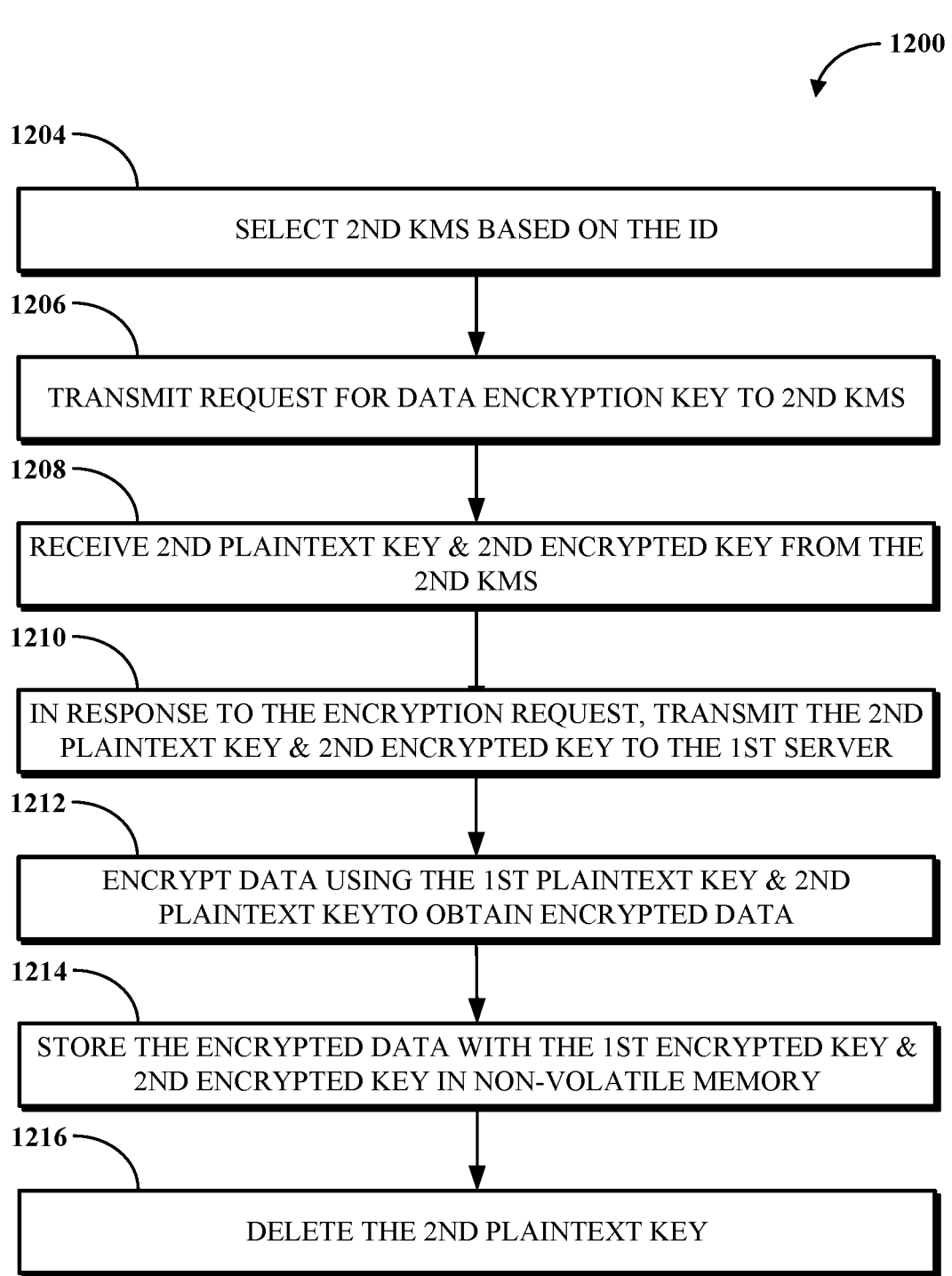

1200

1204 — SELECT 2ND KMS BASED ON THE ID

1206 — TRANSMIT REQUEST FOR DATA ENCRYPTION KEY TO 2ND KMS

1208 — RECEIVE 2ND PLAINTEXT KEY & 2ND ENCRYPTED KEY FROM THE 2ND KMS

1210 — IN RESPONSE TO THE ENCRYPTION REQUEST, TRANSMIT THE 2ND PLAINTEXT KEY & 2ND ENCRYPTED KEY TO THE 1ST SERVER

1212 — ENCRYPT DATA USING THE 1ST PLAINTEXT KEY & 2ND PLAINTEXT KEYTO OBTAIN ENCRYPTED DATA

1214 — STORE THE ENCRYPTED DATA WITH THE 1ST ENCRYPTED KEY & 2ND ENCRYPTED KEY IN NON-VOLATILE MEMORY

1216 — DELETE THE 2ND PLAINTEXT KEY

FIG. 12

DISTRIBUTED ENCRYPTION KEY ALLOCATION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for distributed encryption key allocation.

One aspect of this disclosure is a method including receiving an encryption request from a first server that includes an identifier for one or more users; selecting a key management server based on the identifier; transmitting a request for a data encryption key to the selected key management server; receiving a plaintext key and an encrypted key from the key management server; in response to the encryption request, transmitting the plaintext key and the encrypted key to the first server; and deleting the plaintext key.

One aspect of this disclosure is a personal computing device, including a network interface, a processor, and a memory, wherein the memory stores instructions executable by the processor to: receive an encryption request from a first server that includes an identifier for one or more users; select a key management server based on the identifier; transmit, using the network interface, a request for a data encryption key to the selected key management server; receive, using the network interface, a plaintext key and an encrypted key from the key management server; in response to the encryption request, transmit the plaintext key and the encrypted key to the first server; and delete the plaintext key.

One aspect of this disclosure is a non-transitory computer-readable storage medium, comprising executable instructions that, when executed by a processor, facilitate performance of operations, including receiving an encryption request from a first server that includes an identifier for one or more users; selecting a key management server based on the identifier; transmitting a request for a data encryption key to the selected key management server; receiving a plaintext key and an encrypted key from the key management server; in response to the encryption request, transmitting the plaintext key and the encrypted key to the first server; and deleting the plaintext key.

One aspect of this disclosure is a method including receiving a decryption request from a first server that includes an identifier for one or more users and an encrypted key; selecting a key management server based on the identifier; transmitting a request for a data encryption key to the selected key management server, wherein the request includes the encrypted key; receiving a plaintext key from the key management server; in response to the decryption request, transmitting the plaintext key to the first server; and deleting the plaintext key.

One aspect of this disclosure is a personal computing device, including a network interface, a processor, and a memory, wherein the memory stores instructions executable by the processor to: receive a decryption request from a first server that includes an identifier for one or more users and an encrypted key; select a key management server based on the identifier; transmit a request for a data encryption key to the selected key management server, wherein the request includes the encrypted key; receive a plaintext key from the key management server; in response to the decryption request, transmit the plaintext key to the first server; and delete the plaintext key.

One aspect of this disclosure is a non-transitory computer-readable storage medium, comprising executable instructions that, when executed by a processor, facilitate performance of operations, including receiving a decryption request from a first server that includes an identifier for one or more users and an encrypted key; selecting a key management server based on the identifier; transmitting a request for a data encryption key to the selected key management server, wherein the request includes the encrypted key; receiving a plaintext key from the key management server; in response to the decryption request, transmitting the plaintext key to the first server; and deleting the plaintext key.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 7 is a flowchart of an example of a technique for encryption using distributed encryption key allocation for use in a software platform (e.g., a UCaaS platform).

FIG. 8 is a flowchart of an example of a technique for decryption using distributed encryption key allocation for use in a software platform (e.g., a UCaaS platform).

FIG. 10 is a flowchart of an example of a technique for provisioning a key management server for generating data encryption keys for a group of users.

FIG. 12 is a flowchart of an example of a technique for encrypting data using multiple data encryption keys provided by different key management servers.

DETAILED DESCRIPTION

Figure 1:
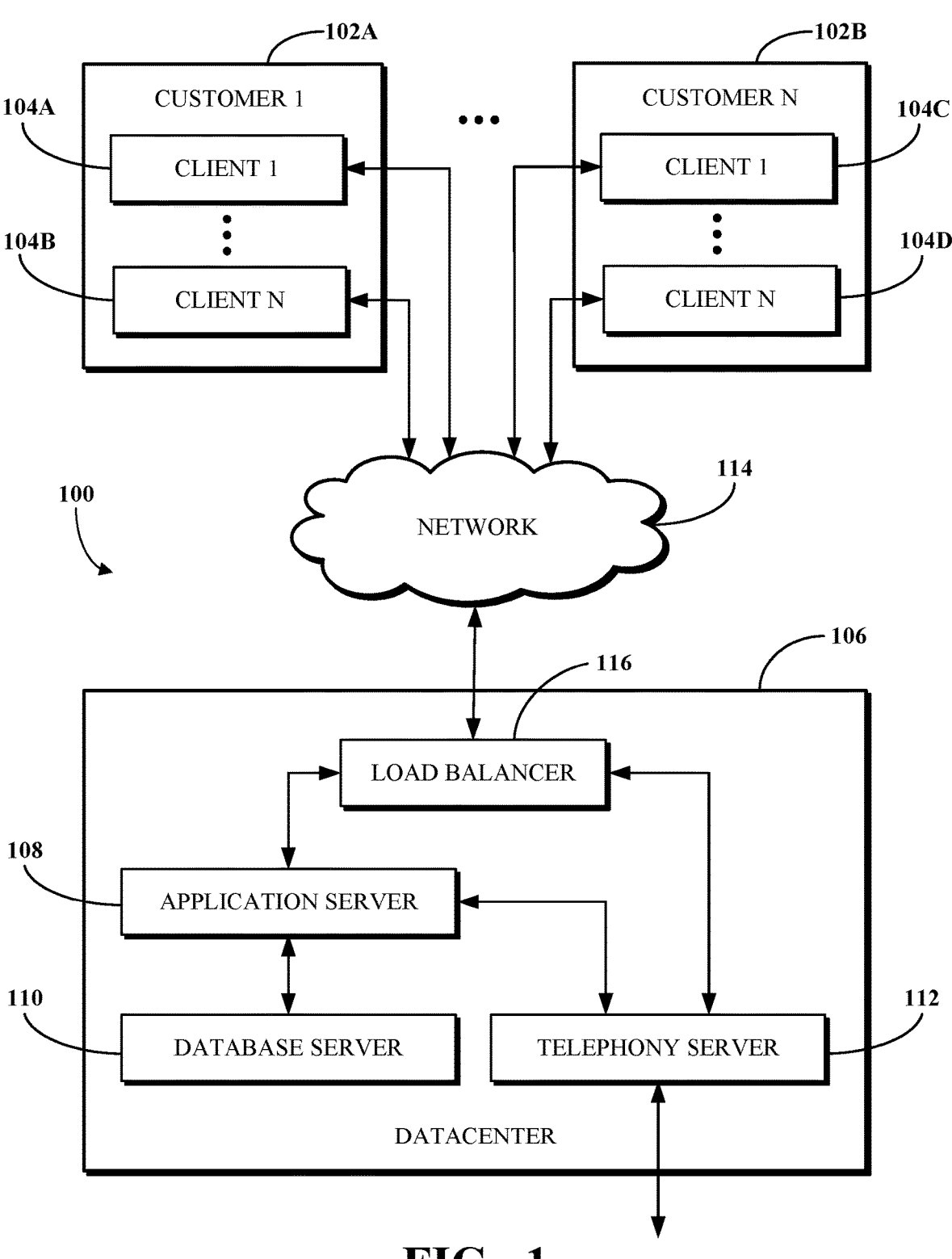
FIG. 1 is a block diagram of an example of an electronic computing and communications system.

Customers of a software platform, such as a UCaaS platform, often want to manage their own encryption keys that are used to encrypt communications data stored in the software platform. A user may send and receive information via a number of different communications channels within a software platform. Some of the data from these communication channels is stored for future use by the software platform, for example, recordings of a conference, voicemail, e-mail, collaboration meeting room (CMR), webinars, calendar tokens, virtual whiteboards, chat, chat file transfer (e.g., including image sharing), archiving (e.g., archiving for conference, webinar, and phone), short message service (SMS), dashboard and reports (e.g., dashboard for conference, webinar, and phone), or transcripts (e.g., transcripts for conference, webinar, and phone). There is a technical problem to utilize different encryption keys across many channels of communication for different user groups that are provided by servers (e.g., key management servers) associated with those groups of users. Changes to key management servers by various clients can break previously established encryption protocols and make content that has been encrypted unavailable to a user or lead to implementation of improper security protocols.

Implementations of this disclosure may address problems such as these by creating a key broker server that dynamically allocates data encryption keys, which are generated by customer specific or customer controlled key management servers, to various communications services within a software platform (e.g., a UCaaS platform) as they are needed to encrypt or decrypt communications data of users associated with a customer. A key broker server may be implemented to support a capability for customers to supply and control their own encryption keys (e.g., using a cloud-based management server) for use in the software platform. In some implementations, data encryption keys may be generated and then passed across a trust boundary into a software platform that the customer uses. The system may allow agents that maintain the software and agents of a customer to operate within their own respective trust boundaries. In an example, a system including a key broker server may be used to protect a conference recording using a bring-your-own-key framework for encryption of certain user data in the software platform for secure storage. A conference recording service may query the key broker to request the customer's data key for use with the conference recording. This data key may be generated by a key management server associated with the customer and returned in both encrypted and plaintext forms. The plaintext data key is used to encrypt the conference recording. The encrypted conference recording and encrypted data key are written to disk as a combined unit, while the plaintext data key is not saved and may be deleted from the software platform upon completion of the subject encryption operation.

Customer Master Keys (CMKs) may be used to encrypt data keys. In some implementations, there may be one data key per asset being protected. Symmetric cryptography (e.g., AES-256 GCM) may be used, where the same key is used for both encryption and decryption.

To decrypt an encrypted asset (e.g., a conference recording), the encrypted data key associated with the recording is sent by the recording service to a key broker server. The key broker server maps a request for decryption to an appropriate key management server and forwards that encrypted data key to an implicated customer's key management server to fetch a decrypted, plaintext copy of the data key, which is used to decrypt the encrypted asset for access by authorized customer users. The returned plaintext data key is not stored in non-volatile memory and may be deleted from the UCaaS platform upon completion of the decryption operation.

The pattern of storing the encrypted data key along with the encrypted asset may be referred to as "envelope encryption". In an example, an Amazon Web Services Key Management Service (AWS KMS) that supports envelope encryption may be used by a customer to supply the needed data keys for its users' data in the software platform. A key broker server may provide a consistent interface to multiple communications services in the software platform for accessing data encryption keys generated by a variety of key management servers associated with different customers.

Some implementations may provide advantages over conventional systems, such as enabling customer control of data encryption keys used in a software platform while reducing customer onboarding time and decreasing system downtime caused by errors in retrieving data encryption keys.

To describe some implementations in greater detail, reference is first made to examples of hardware and software structures used to implement distributed encryption key allocation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. Datacenters may be spread across various geographical locations. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
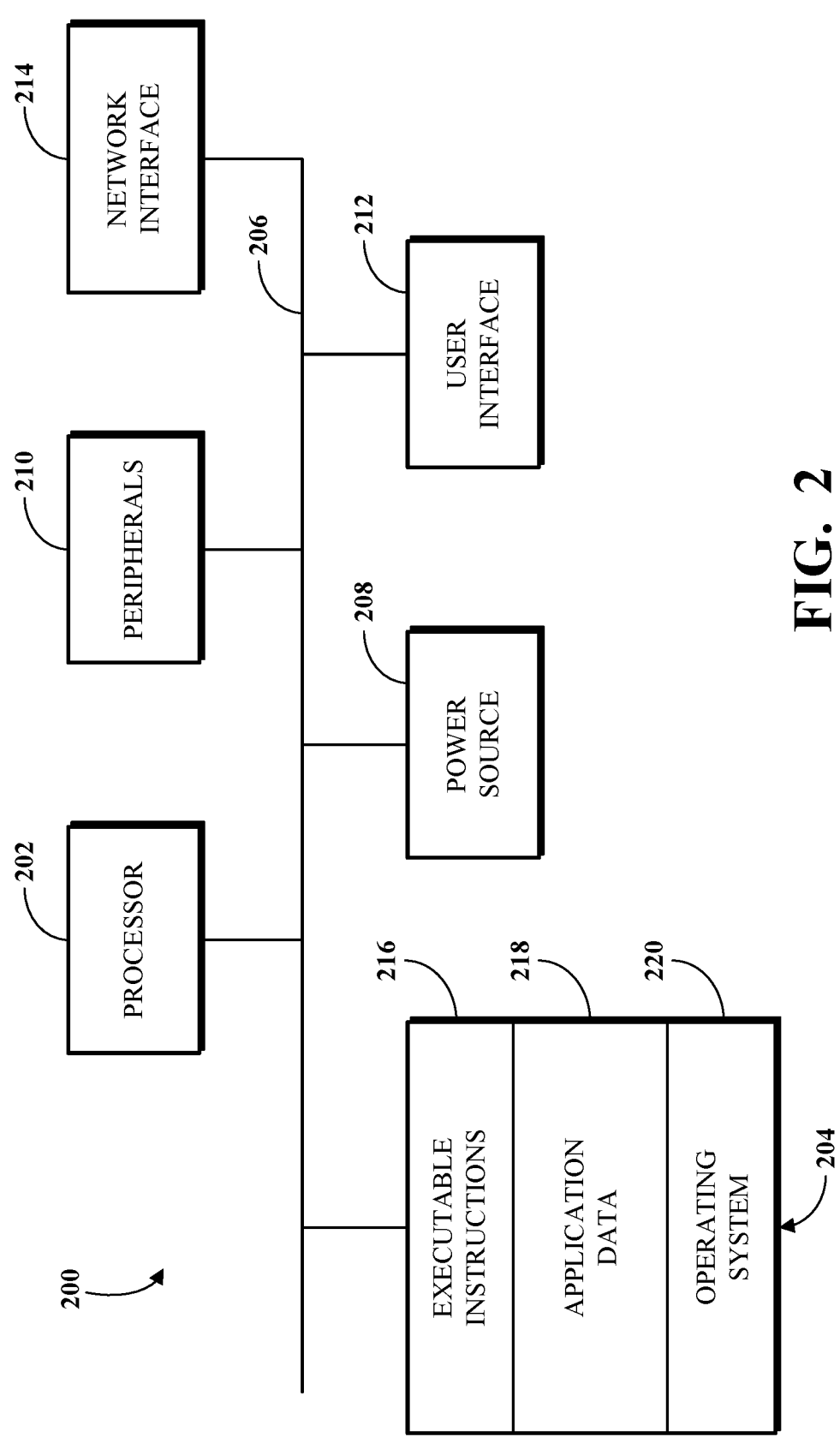
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
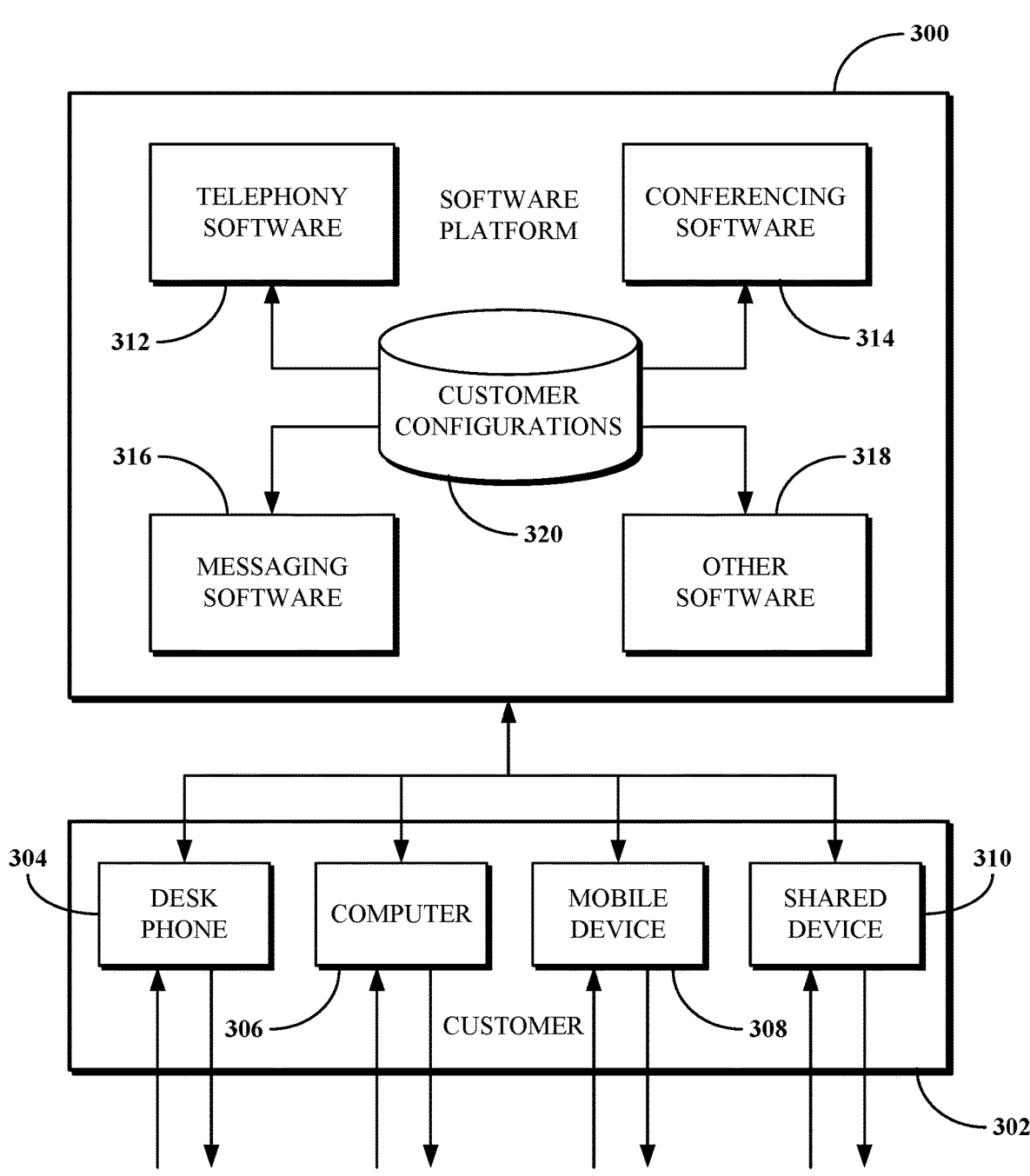
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for encryption and decryption of data in the software platform 300 using distributed encryption key allocation.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through

318 may be combined into a single software application run on clients of the customer, such as one or more of the clients 304 through 310.

Figure 4:
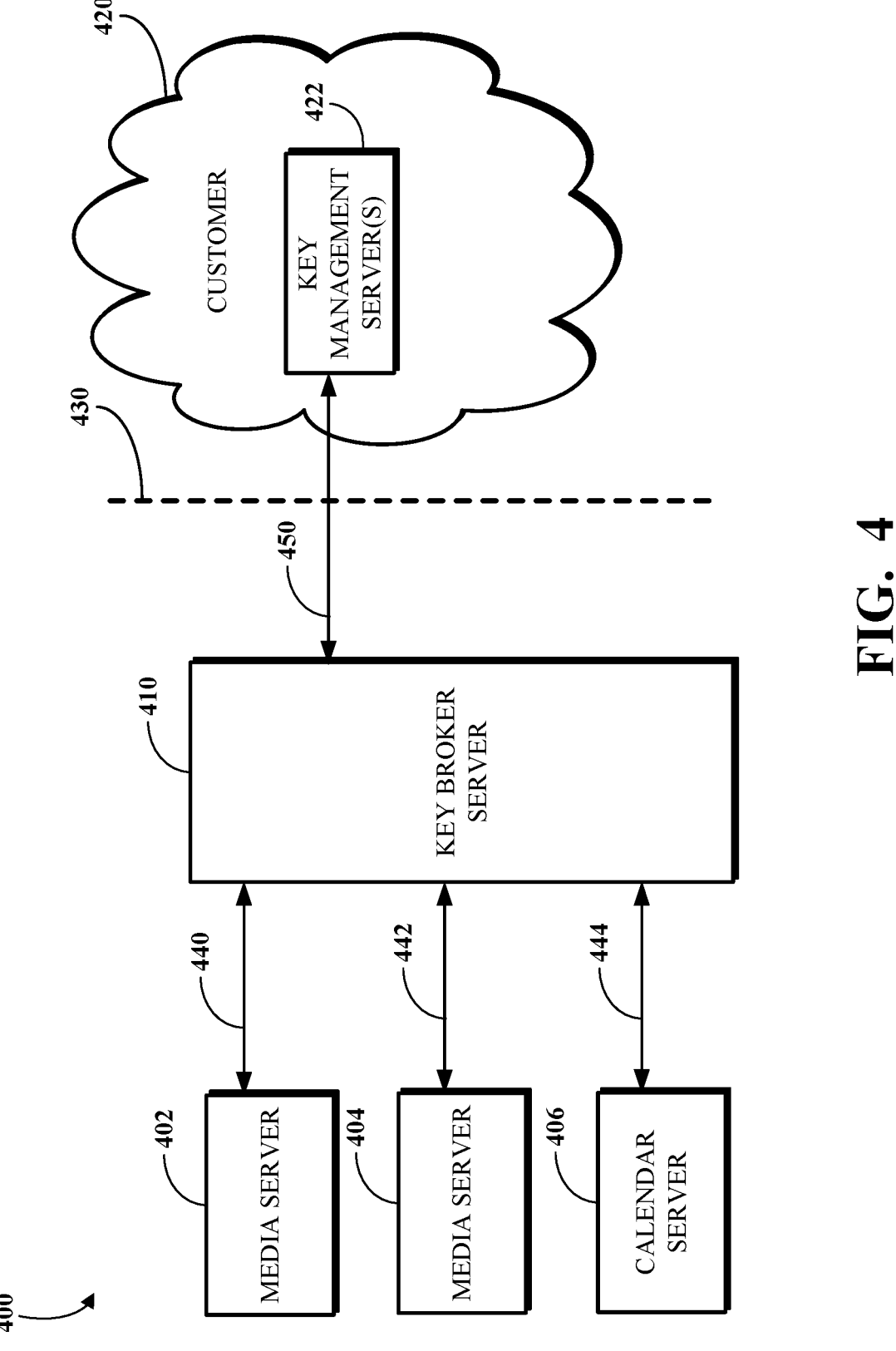
FIG. 4 is a block diagram of an example of a system for distributed encryption key allocation for use in a software platform (e.g., a UCaaS platform).

FIG. 4 is a block diagram of an example of a system 400 for distributed encryption key allocation for use in a software platform (e.g., a UCaaS platform). The system 400 includes a media server 402 configured to conduct conferences and/or webinars (e.g., using the conferencing software 314) for users of the software platform; a media server 404 configured to conduct phone calls and/or receive voicemails (e.g., using the telephony software 312) for users of the software platform; a calendar server 406 configured to provide calendar services for users of the software platform, including maintaining user calendars and/or calendars for conference rooms or other shared equipment; a key broker server 410 configured to dynamically allocate data encryption keys for users associated with customers of the software platform that are controlled by those customers; and a customer network infrastructure 420, including one or more key management servers 422 configured to generate data encryption keys for users associated with the customer that may be used to encrypt and decrypt data of those users in the software platform (e.g., a UCaaS platform). In some implementations, the one or more key management servers 422 includes a primary key management server and one or more failover key management servers to improve reliability of the system 400. The key broker server 410 interfaces to the one or more key management servers 422 across a trust boundary 430. In some implementations, the system 400 may be used to implement the technique 700 of FIG. 7. For example, the technique 700 of FIG. 7 may be implemented by the key broker sever 410 and the media server 402, the media server 404, or the calendar server 406. In some implementations, the system 400 may be used to implement the technique 800 of FIG. 8. For example, the technique 800 of FIG. 8 may be implemented by the key broker sever 410 and the media server 402, the media server 404, or the calendar server 406.

The media server 402 is configured to submit encryption and decryption requests 440 to the key broker server 410. Likewise, the media server 404 is configured to submit encryption and decryption requests 442 to the key broker server 410. The calendar server 406 is configured to submit encryption and decryption requests 444 to the key broker server 410. The key broker server 410 is configured to map the requests from the media server 402, the media server 404, and the calendar server 406 to requests for data encryption keys to the one or more key management servers 422 for a customer associated with a user invoking a request for encryption or decryption. Once the appropriate key management server for a request has been identified, the key broker server 410 is configured to submit encryption and decryption requests 450 to the one or more key management servers 422. When the one or more key management servers 422 verify user permissions for the requested encryption or decryption, a data encryption key is returned to the key broker server 410, which in turn relays the data encrypting or decrypting encryption key to the requesting server for use in encrypting or decrypting data.

In some implementations, the system 400 is configured to prevent customers from encrypting and decrypting to a different customer's key by using an account ID unique to each customer. A customer may be enabled to log events in a fine-grained fashion. For example, a customer may be enabled to prevent encryption and decryption events based on asset type, time, and other variables, such as type of asset (e.g., Conference/Webinar recordings vs. Calendar Token), individual assets identified by some characteristics (e.g., prevent decryption of a certain conference recording), or timestamps (e.g., prevent decryption for assets that were created between time X and time Y). In an example, a signal may be sent to a customer that an application programming interface (API) call is being made to the customer not on behalf of a trigger by a customer employee.

Individual assets may be identified based on information about the asset. A conference/webinar may have fields of associated metadata including: Meeting or Webinar, conference identifier, and recording start time. A phone recording/voicemail may have fields of associated metadata including: phone, phone number, and timestamp. Calendar tokens for a conference room may have fields of associated metadata including: calendar token type, unique calendar token identifier, and timestamp. User calendar tokens may have fields of associated metadata including: user calendar type, unique calendar identifier, and timestamp. Examples of use cases of encryption context applied by customer include by asset type, by individual asset, and by timestamp.

The key broker server 410 includes a network interface (e.g., the network interface 214), a processor (e.g., the processor 202), and a memory (e.g., the memory 204). In some implementations, the broker server 410 includes the computing device 200. In some implementations, the memory stores instructions executable by the processor to receive an encryption request from a first server that includes an identifier for one or more users; select a key management server based on the identifier; transmit, using the network interface, a request for a data encryption key to the selected key management server; receive, using the network interface, a plaintext key and an encrypted key from the key management server; in response to the encryption request, transmit the plaintext key and the encrypted key to the first server; and delete the plaintext key.

In some implementations, the media server 402 is configured to encrypt a recording of a conference conducted by the first server using the plaintext key to obtain an encrypted recording and store the encrypted recording with the encrypted key in non-volatile memory. In some implementations, the memory stores instructions executable by the processor to configure the key management server to generate data keys and associate the key management server with a group of one or more users. In some implementations, the memory stores instructions executable by the processor to receive, using the network interface, an encryption algorithm identifier from the key management server; and select an encryption algorithm to be applied with the plaintext key based on the encryption algorithm identifier. In some implementations, the memory stores instructions executable by the processor to receive, using the network interface, a destination address from the key management server; and store the encrypted key and data encrypted with the plaintext key in non-volatile memory at the destination address.

The key broker server may also be configured to facilitate decryption. In some implementations, the memory stores instructions executable by the processor to receive a decryption request from a first server that includes an identifier for one or more users and an encrypted key; select a key management server based on the identifier; transmit a request for a data encryption key to the selected key management server, the request including the encrypted key; receive a plaintext key from the key management server; in response to the decryption request, transmit the plaintext key to the first server; and delete the plaintext key.

In some implementations, the media server 402 is configured to decrypt an encrypted recording of a conference conducted by the first server using the plaintext key to obtain a decrypted recording.

Figure 5:
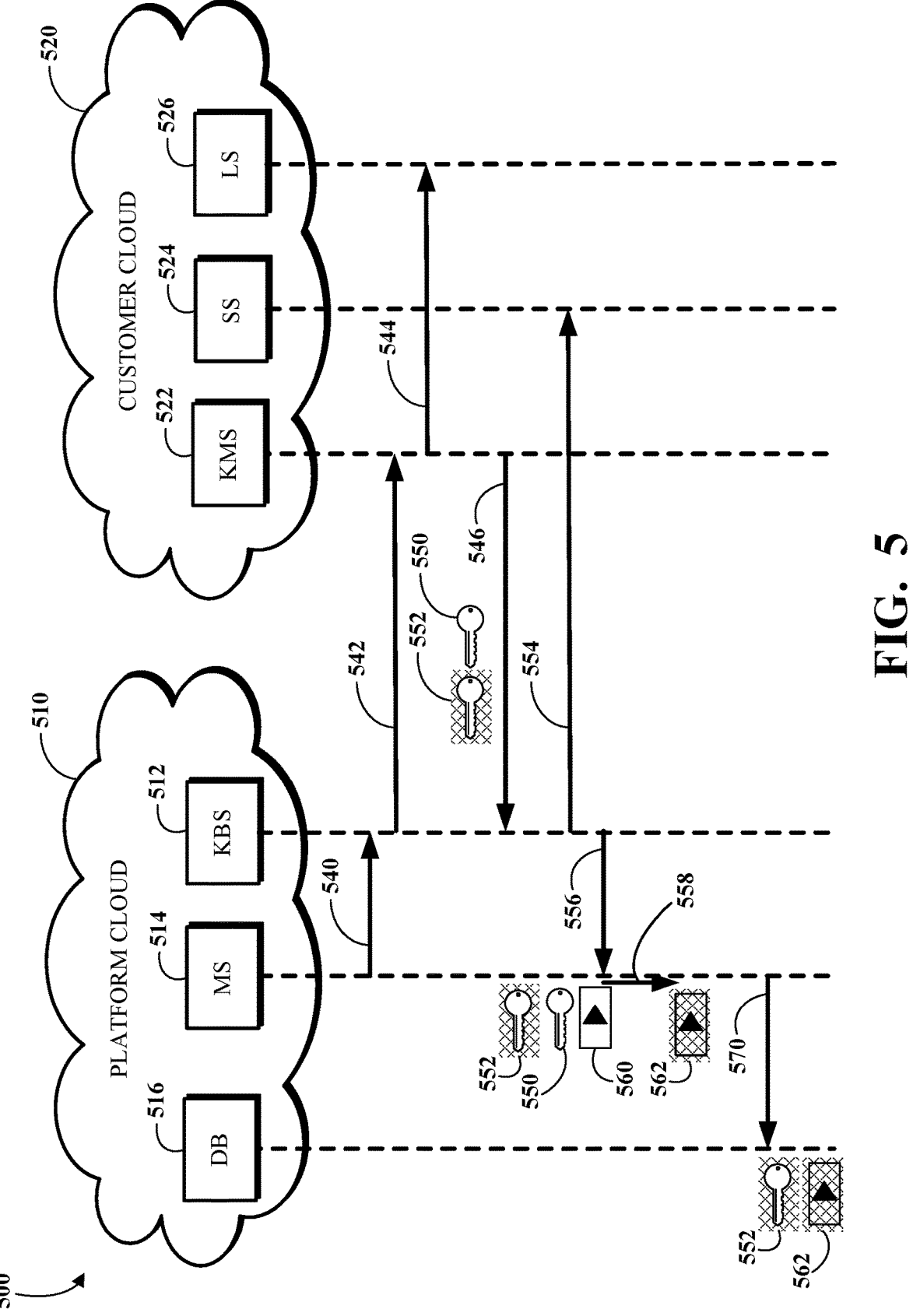
FIG. 5 is a signal flow diagram of an example of an encryption operation using distributed encryption key allocation for use in a software platform (e.g., a UCaaS platform).

FIG. 5 is a signal flow diagram of an example of an encryption operation 500 using distributed encryption key allocation for use in a software platform (e.g., a UCaaS platform). The encryption operation 500 includes signal propagating between servers in a software platform cloud 510 and a customer cloud 520. There may be a trust boundary between the software platform cloud 510 and the customer cloud 520. The software platform cloud 510 includes a key broker server 512 (e.g., the key broker server 410), a media server 514 (e.g., the media server 402), and a database server 516 (e.g., the database server 110). The customer cloud 520 includes a key management server 522 (e.g., the key management server 422), a security server 524 (e.g., an AWS Cloud Watch server), and a log server 526 (e.g., an AWS Cloud Trails server).

At 540, a request for a data key for encryption is sent from the media server 514 to the key broker server 512. The request may include an identifier for a user or group of users associated with the data that media server will encrypt. At 542, a request for a data key for encryption is sent from the key broker server 512 to the key management server 522. The request may include an API call to a key management service of the customer to get a new data key, which may be returned in both plaintext and encrypted forms. The key management server 522 may have been selected by the key broker server 512 based on the identifier that was included in the request at 540. At 544, the key management server 522 sends a message to the log server 526 to log the activity of the request at 542.

At 546, the key management server 522 returns a plaintext key 550 and an encrypted key 552 to the key broker server 512. The key management server 522 may use a CMK to encrypt the data key that is returned in both plaintext and encrypted forms. In some implementations, there is one data key per asset (e.g., a conference recording, a webinar recording, a phone call recording, a voicemail, or an email) being protected. In some implementations, symmetric cryptography (e.g., AES-256 GCM) is used, thus the same key is used for both encryption and decryption. At 554, the key broker server 512 sends a message acknowledging receipt of the plaintext key 550 and the encrypted key 552 to the security server 524. The security server 524 may be configured to issue alerts (e.g., a Cloud Watch alarm) when certain conditions or events are detected. At 556, the key broker server 512 passes the plaintext key 550 and the encrypted key 552 to the media server 514 in response to the request at 540.

At 558, the media server 514 encrypts an asset 560 (e.g., a conference recording) using the plaintext key 550 to obtain an encrypted asset 562. At 570, the media server 514 writes the encrypted asset 562 and the encrypted key 552 to non-volatile memory (e.g., a disk) on the database server 516 as a combined unit, while the plaintext data key is not saved. The plaintext key 550 may be deleted from the software platform cloud 510 after the encryption operation 500 is completed.

Figure 6:
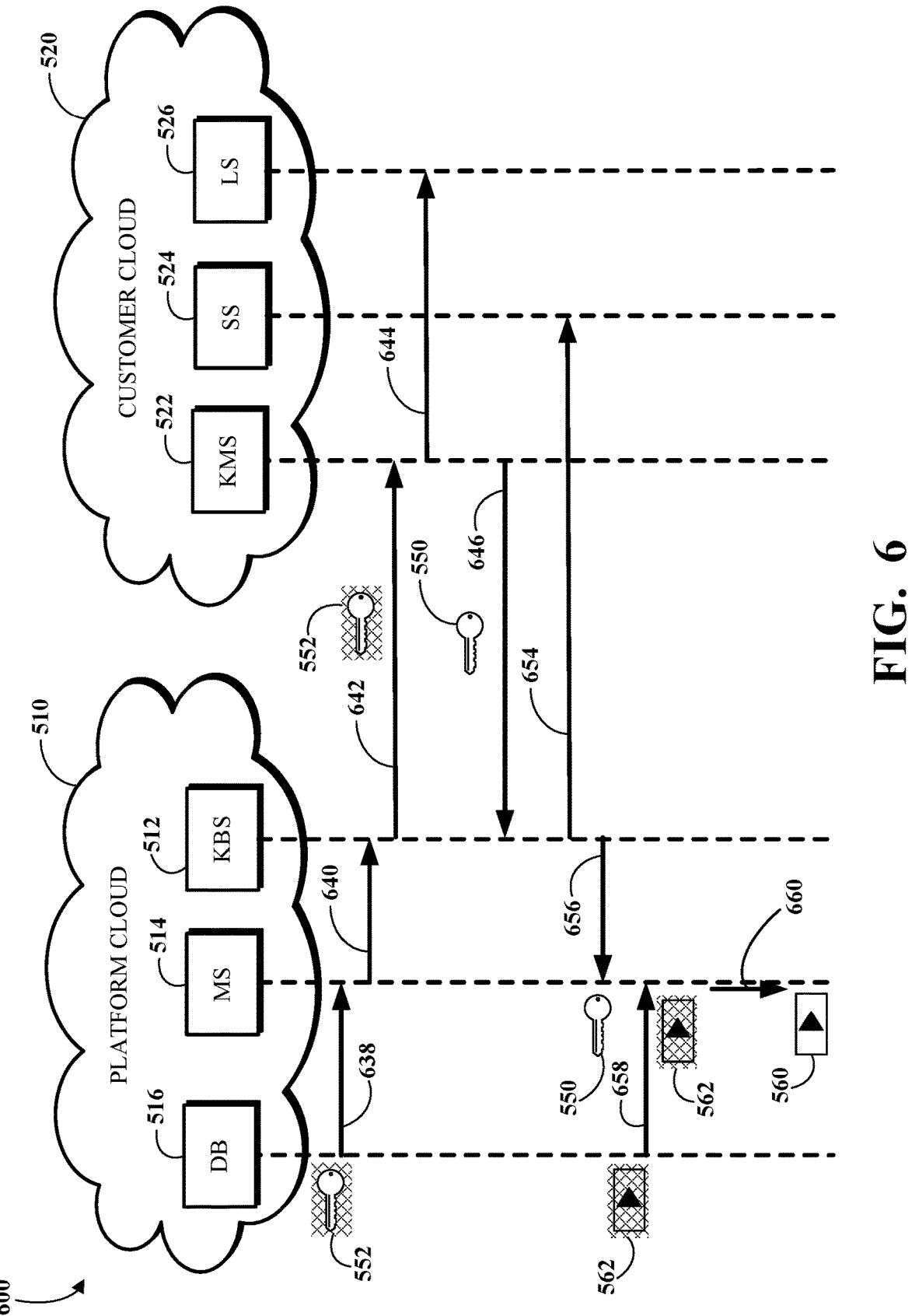
FIG. 6 is a signal flow diagram of an example of a decryption operation using distributed encryption key allocation for use in a software platform (e.g., a UCaaS platform).

FIG. 6 is a signal flow diagram of an example of a decryption operation 600 using distributed encryption key allocation for use in a software platform (e.g., a UCaaS platform). The decryption operation 600 is performed by the same devices shown implementing the encryption operation 500 in FIG. 5.

At 638, the encrypted key 552 is read from non-volatile memory (e.g., a disk) on the database server 516 by the media server 514 when it prepares to access the encrypted asset 562. At 640, the encrypted key 552 is passed from the media server 514 to the key broker server 512 in a request for decryption. At 642, a request for decryption of the encrypted key 552 is sent from the key broker server 512 to the key management server 522. At 644, the key management server 522 sends a message to the log server 526 to log the activity of the request at 642.

At 646, the key management server 522 returns a plaintext key 550 to the key broker server 512. The plaintext key 550 is a decrypted version of the encrypted key 552. At 654, the key broker server 512 sends a message acknowledging receipt of the plaintext key 550 to the security server 524. The security server 524 may be configured to issue alerts (e.g., a Cloud Watch alarm) when certain conditions or events are detected. At 656, the key broker server 512 passes the plaintext key 550 to the media server 514 in response to the request at 640.

At 658, the encrypted asset 562 is read from non-volatile memory (e.g., a disk) on the database server 516 by the media server 514. At 660, the media server 514 decrypts the encrypted asset 562 using the plaintext key 550 to obtain the asset 560 (e.g., a conference recording). The asset 560 may then be delivered to a user associated with the customer. The plaintext key 550 may be deleted from the software platform cloud 510 after the encryption operation 500 is completed.

To further describe some implementations in greater detail, reference is next made to examples of techniques which may be performed by or using distributed encryption key allocation. FIG. 7 is a flowchart of an example of a technique 700 for encryption using distributed encryption key allocation for use in a software platform (e.g., a UCaaS platform). The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, the technique 700 includes receiving an encryption request from a first server that includes an identifier for one or more users. In some implementations, the first server is part of a UCaaS system configured to support multiple modes of communication via one or more electronic communications networks. The first server may be configured to record or otherwise access communications data for users of an software platform (e.g., a UCaaS platform) to provide a communications service, such as, recording conference calls, recording webinars, recording phone calls or voice-mails, receiving email, or updating calendar information including tokens. In some implementations, the first server is a media server configured to host conference software. Some examples of the first server include the media server

402, the media server 404, the calendar server 406, and an email server. The identifier may specify a single user or a group of users that are associated with a security context. The identifier may include a customer identification number that has been associated with communication data that is to be encrypted. The identifier may include a host email address associated with a conference, a webinar, a phone call, a calendar, or a calendar token from which data is to be encrypted. In some implementations, the identifier includes a telephone number associated with a phone call or voice-mail from which data is to be encrypted. In one example, the encryption request may be received using a network interface (e.g., the network interface 214) of a key broker server (e.g., the key broker server 410).

At 704, the technique 700 includes selecting a key management server based on the identifier. In some implementations, the identifier associated with the data to be encrypted may be mapped to a key management server by matching the identifier to a list of user identifiers associated with a customer of a software platform (e.g., a UCaaS platform). The customer may have one or more key management servers that are configured to issue data encryption keys for its users. In an example, a customer may have multiple key management servers to provide redundancy, reliability, and increased uptime for its cloud infrastructure. A customer's key management servers may be updated or otherwise changed from time to time. A customer may be associated with a security context in the software platform (e.g., as part of the customer configurations 320) that includes a list of one or more key management servers. Lists of active key management servers for various customers may be maintained by a key broker server and updated via a customer configuration interface. Once the identifier has been mapped to a customer, a key management server may be selected from the list of key management servers for that customer based on considerations such as, availability (e.g., current network reachability), customer specified priority in the list, and time of day.

In some implementations, the key management server is selected based on a multiple factors. For example, key management server may be selected based on an indication, included in the encryption request, of a type of data to be encrypted and/or based on an indication, included in the encryption request, of a geographic region associated with data to be encrypted in addition to being selected based on the identifier. For example, selecting the key management server may include implementing the technique 1100 of FIG. 11.

The key management server may have been provisioned and configured by the customer outside of the software platform (e.g., a UCaaS platform). In some implementations, a customer may request for the software platform to establish a key management server specific to the customer on behalf of the customer. For example, the technique 1000 of FIG. 10 may be implemented by a key broker server to configure a key management server for customer.

At 706, the technique 700 includes transmitting a request for a data encryption key to the selected key management server. In some implementations, the request includes identifying information for a user or group of users associated with a security policy implemented by the selected key management server, such as an Amazon Web Services Identity and Access Management (AWS IAM) policy. For example, the request may include an AWS IAM identity (e.g., user, group of users, or role). In some implementations, the request is for an envelope encryption key. In one example, the encryption request may be transmitted using a network interface (e.g., the network interface 214) of a key broker server (e.g., the key broker server 410).

At 708, the technique 700 includes receiving a plaintext key and an encrypted key from the key management server. The plaintext key may be a data encryption key that can be directly used to encrypt data using an encryption algorithm. The plaintext key may be a symmetric key that can be used to both encrypt and to decrypt data. In some implementations, the plaintext key may be an asymmetric key that can be used for encryption and is paired with another key for decryption. The key management server may use a CMK to encrypt the plaintext key. In some implementations, the plaintext key is a data key that is unique to the communications data to be encrypted as part of the technique 700. The encrypted key is an encrypted version of the plaintext key. The encrypted key has been encrypted with a separate encryption key retained by the key management server. Thus, the key management server may retain the exclusive capability to decrypt the encrypted data later using the encrypted key, after the plaintext key has been deleted. In some implementations, the encryption algorithm is implied or has been previously specified by communications separate from the request and its response. In some implementations, the encryption algorithm is dynamically specified by the key management server in response to the request. In some examples, an encryption algorithm identifier is received from the key management server and an encryption algorithm to be applied with the plaintext key is selected based on the encryption algorithm identifier. Other security parameters of the encryption and storage of the communications data to be encrypted may be received from the key management server. For example, a destination address may be received from the key management server and the encrypted key and data encrypted with the plaintext key may be stored in non-volatile memory at the destination address (e.g., an address associated with a particular database or file server with technical parameters that has been selected and provisioned for a customer). The technique 700 may include implementing the technique 900 of FIG. 9. In one example, the plaintext key and the encrypted key may be received using a network interface (e.g., the network interface 214) of a key broker server (e.g., the key broker server 410).

At 710, the technique 700 includes, in response to the encryption request, transmitting the plaintext key and the encrypted key to the first server. In some implementations, the plaintext key and the encrypted key are relayed to the first server, which will perform the encryption of the communications data, along with other data from the key management server specifying how the data should be encrypted and stored, such as an encryption algorithm identifier and/or a destination address for the encrypted data. In one example, the plaintext key and the encrypted key may be transmitted using a network interface (e.g., the network interface 214) of a key broker server (e.g., the key broker server 410).

At 712, the technique 700 includes encrypting data using the plaintext key to obtain encrypted data. The data to be encrypted may be of various types of data recorded or maintained in the software platform (e.g., a UCaaS platform). In some implementations, the technique 700 includes encrypting a recording of a conference conducted by the first server using the plaintext key to obtain an encrypted recording. In some implementations, the technique 700 includes encrypting a recording of a phone call conducted by the first server using the plaintext key to obtain an encrypted recording. In some implementations, the technique 700 includes encrypting a voicemail received by the first server using the plaintext key to obtain an encrypted recording. In some implementations, the technique 700 includes encrypting a calendar token generated by the first server using the plaintext key to obtain an encrypted token. In some implementations, the technique 700 includes encrypting a recording of a webinar conducted by the first server using the plaintext key to obtain an encrypted recording. In some implementations, the technique 700 includes encrypting a virtual whiteboard hosted by the first server using the plaintext key to obtain an encrypted data. In some implementations, the technique 700 includes encrypting a chat hosted by the first server using the plaintext key to obtain an encrypted data. In some implementations, the technique 700 includes encrypting an archive hosted by the first server using the plaintext key to obtain an encrypted data. In some implementations, the technique 700 includes encrypting a SMS message hosted by the first server using the plaintext key to obtain an encrypted data. In some implementations, the technique 700 includes encrypting a dashboard hosted by the first server using the plaintext key to obtain an encrypted data. In some implementations, the technique 700 includes encrypting a transcript (e.g., a transcript for a conference, a webinar, or a phone call) hosted by the first server using the plaintext key to obtain an encrypted data. In some implementations, the data may be encrypted using an encryption algorithm (e.g., AES-256 GCM) specified by an encryption algorithm identifier from the key management server.

In some implementations, the data may be encrypted using multiple encryption keys acquired from different key management servers. In some cases, the multiple key management servers used may be associated with different respective customers of a software platform (e.g., a UCaaS platform). For example, data keys from multiple customers may be used for encryption to facilitate sharing of encrypted data and collaboration between users respectively associated with the different customers. In an example, the data (e.g., a recording of conference) may be encrypted by the first server using a first plaintext key acquired from a first key management server and using a second plaintext key acquired from a second key management server to obtain an encrypted data. For example, the technique 700 may include implementing the technique 1200 of FIG. 12.

At 714, the technique 700 includes storing the encrypted data with the encrypted key in non-volatile memory (e.g., a hard drive or flash memory). The encrypted data may be of various types. For example, the technique 700 may include storing the encrypted recording (e.g., of a conference, a webinar, a phone call, or a voicemail) with the encrypted key in non-volatile memory. For example, the technique 700 may include storing the encrypted token (e.g., a calendar token) with the encrypted key in non-volatile memory. In some implementations, the encrypted data may be stored in a database or a file server (e.g., the database server 110) by the first server (e.g., the telephony server 112, the media server 402, the media server 404, or the calendar server 406).

At 716, the technique 700 includes deleting the plaintext key. The plaintext key may be deleted from the software platform (e.g., a UCaaS platform) altogether. The plaintext key may be deleted by a key broker server that relayed the plaintext key and by the first server that used the plaintext key to perform the encryption. Deleting the plaintext key may help to prevent the encrypted data from being accessed in the future without permission from a key management server of the customer.

FIG. 8 is a flowchart of an example of a technique 800 for decryption using distributed encryption key allocation for use in a software platform (e.g., a UCaaS platform). The technique 800 can be executed using computing devices, such as the systems, hardware, and software described with respect to FIGS. 1-6. The technique 800 can be performed, for example, by executing a machine-readable program or other computer-executable instructions, such as routines, instructions, programs, or other code. The steps, or operations, of the technique 800 or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, the technique 800 includes receiving a decryption request from a first server that includes an identifier for one or more users and an encrypted key. In some implementations, the first server is part of a software platform (e.g., a UCaaS platform) configured to support multiple modes of communication via one or more electronic communications networks. The first server may be configured to record or otherwise access communications data for users of a software platform (e.g., a UCaaS platform) to provide a communications service, such as, recording conference calls, recording webinars, recording phone calls or voicemails, receiving email, or updating calendar information including tokens. In some implementations, the first server is a media server configured to host conference software. Some examples of the first server include the media server 402, the media server 404, the calendar server 406, and an email server. The identifier may specify a single user or a group of users that are associated with a security context. The identifier may include a customer identification number that has been associated with the encrypted data that is to be decrypted. The identifier may include a host email address associated with the encrypted data or a user invoking the request for decryption. The encrypted key has been stored with the encrypted data and is an encrypted version of the data encryption key that was used to encrypt the encrypted data. In one example, the decryption request may be received using a network interface (e.g., the network interface 214) of a key broker server (e.g., the key broker server 410).

At 804, the technique 800 includes selecting a key management server based on the identifier. In some implementations, the identifier associated with the encrypted data to be decrypted may be mapped to a key management server by matching the identifier to a list of user identifiers associated with a customer of a software platform (e.g., a UCaaS platform). The customer may have one or more key management servers that are configured to issue data encryption keys for its users. In an example, a customer may have multiple key management servers to provide redundancy, reliability, and increased uptime for its cloud infrastructure. A customer's key management servers may be updated or otherwise changed from time to time. A customer may be associated with a security context in the software platform (e.g., as part of the customer configurations 320) that includes a list of one or more key management servers. Lists of active key management servers for various customers may be maintained by a key broker server and updated via a customer configuration interface. Once the identifier has been mapped to a customer, a key management server may be selected from the list of key management servers for that customer based on considerations such as, availability (e.g., current network reachability), customer specified priority in the list, and time of day.

At 806, the technique 800 includes transmitting a request for a data encryption key to the selected key management server, wherein the request includes the encrypted key. The key management server may have another key, which may be a CMK, that can be used to decrypt the encrypted key that was stored with the encrypted data. In some implementations, the request includes identifying information for a user or group of users associated with a security policy implemented by the selected key management server, such as an AWS IAM policy. For example, the request may include an AWS IAM identity (e.g., user, group of users, or role). In some implementations, the request is for an envelope encryption key. In one example, the encryption request may be transmitted using a network interface (e.g., the network interface 214) of a key broker server (e.g., the key broker server 410).

At 808, the technique 800 includes receiving a plaintext key from the key management server. The plaintext key may be a decrypted version of the encrypted key that is returned by the key management server after it verifies the permissions associated with the request. The encrypted key may be decrypted by the key management server using a separate encryption key retained by the key management server. In some implementations, the plaintext key may be a symmetric data encryption key that was used to encrypt the encrypted data using an encryption algorithm. In some implementations, the plaintext key may be an asymmetric key that can be used for decryption and is paired with another key that was used for encryption. In some implementations, the plaintext key is a data key that is unique to the encrypted data stored with the encrypted key. In some implementations, the decryption algorithm is implied or has been previously specified by communications separate from the request and its response. In some implementations, the decryption algorithm is dynamically specified by the key management server in response to the request. In some examples, a decryption algorithm identifier is received from the key management server and a decryption algorithm to be applied with the plaintext key is selected based on the decryption algorithm identifier. In one example, the plaintext key may be received using a network interface (e.g., the network interface 214) of a key broker server (e.g., the key broker server 410).

At 810, the technique 800 includes, in response to the decryption request, transmitting the plaintext key to the first server. In some implementations, the plaintext key is relayed to the first server, which will perform the decryption of the encrypted data, along with other data from the key management server specifying how the data should be decrypted, such a decryption algorithm identifier. In one example, the plaintext key may be transmitted using a network interface (e.g., the network interface 214) of a key broker server (e.g., the key broker server 410).

At 812, the technique 800 includes decrypting the encrypted data using the plaintext key to obtain decrypted data. The decrypted data may be of various types of data recorded or maintained in the software platform (e.g., a UCaaS platform). In some implementations, the technique 800 includes decrypting an encrypted recording of a conference conducted by the first server using the plaintext key to obtain a decrypted recording. In some implementations, the technique 800 includes decrypting an encrypted recording of a phone call conducted by the first server using the plaintext key to obtain a decrypted recording. In some implementations, the technique 800 includes decrypting an encrypted voicemail received by the first server using the plaintext key to obtain a decrypted recording. In some implementations, the technique 800 includes decrypting an encrypted calendar token generated by the first server using the plaintext key to obtain a decrypted token. In some implementations, the technique 800 includes decrypting an encrypted recording of a webinar conducted by the first server using the plaintext key to obtain a decrypted recording. In some implementations, the technique 800 includes decrypting an encrypted virtual whiteboard hosted by the first server using the plaintext key to obtain decrypted data. In some implementations, the technique 800 includes decrypting an encrypted chat hosted by the first server using the plaintext key to obtain decrypted data. In some implementations, the technique 800 includes decrypting an encrypted archive hosted by the first server using the plaintext key to obtain decrypted data. In some implementations, the technique 800 includes decrypting an encrypted SMS message hosted by the first server using the plaintext key to obtain decrypted data. In some implementations, the technique 800 includes decrypting an encrypted dashboard hosted by the first server using the plaintext key to obtain decrypted data. In some implementations, the technique 800 includes decrypting an encrypted transcript (e.g., a transcript for a conference, a webinar, or a phone call) hosted by the first server using the plaintext key to obtain decrypted data. In some implementations, the data may be decrypted using a decryption algorithm (e.g., AES-256 GCM) specified by a decryption algorithm identifier from the key management server.

At 814, the technique 800 includes presenting the decrypted data. The decrypted data may be presented in a user interface (e.g., a webpage, a streaming media player, and/or another client application) In some implementations, the decrypted data may be presented by transmitting the decrypted data as part of a graphical user interface using a network interface (e.g., the network interface 214). The decrypted data may be transmitted to a device (e.g., the desk phone 304, the computer 306, the mobile device 308, or the shared device 310) that can used by a user to listen to and/or view the content. In some implementations, the decrypted data may be presented by displaying the decrypted data on a local peripheral (e.g., a monitor, a touchscreen, or other display device).

At 816, the technique 800 includes deleting the plaintext key. The plaintext key may be deleted from the software platform (e.g., a UCaaS platform) altogether. The plaintext key may be deleted by a key broker server that relayed the plaintext key and by the first server that used the plaintext key to perform the decryption. Deleting the plaintext key may help to prevent the encrypted data from being accessed in the future without permission from a key management server of the customer.

Figure 9:
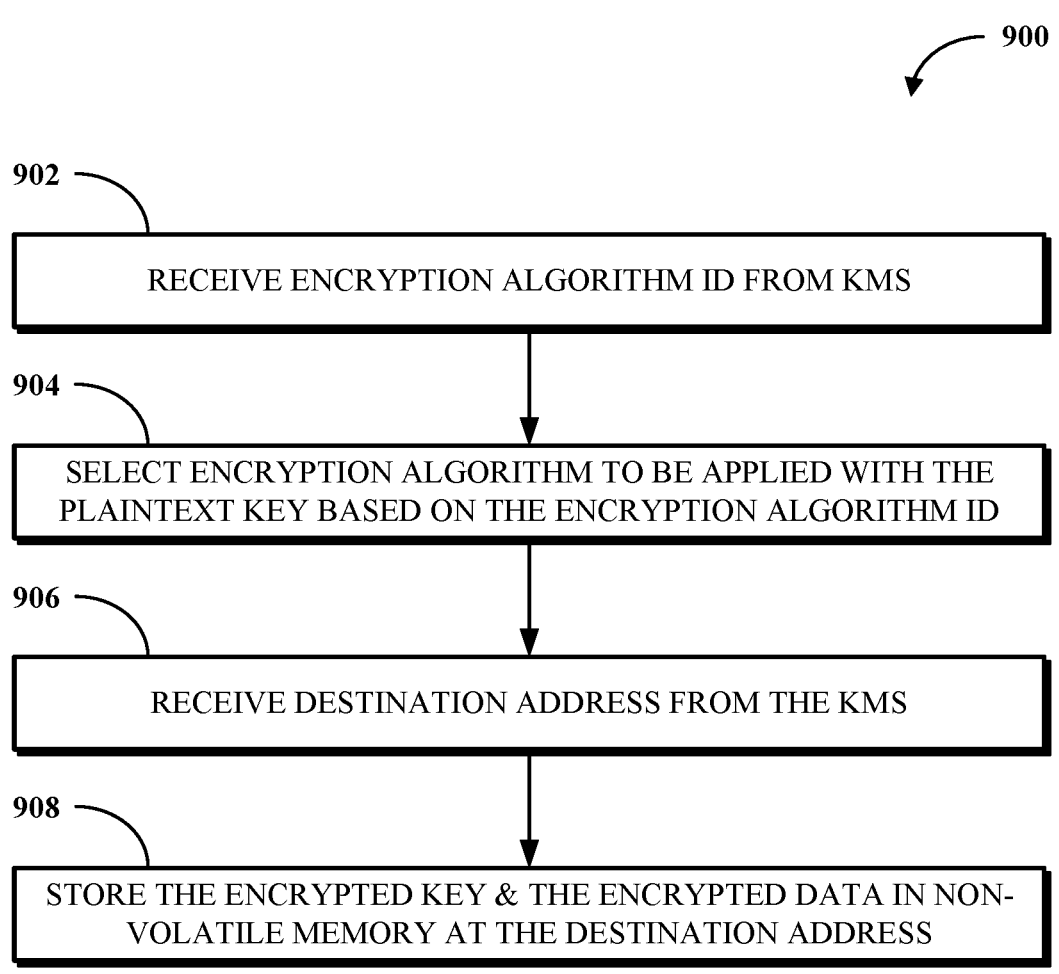
FIG. 9 is a flowchart of an example of a technique for acquiring security parameters from a key management server.

FIG. 9 is a flowchart of an example of a technique 900 for acquiring security parameters from a key management server. The technique 900 can be executed using computing devices, such as the systems, hardware, and software described with respect to FIGS. 1-6. The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, the technique 900 includes receiving an encryption algorithm identifier from the key management server. In this manner, the encryption algorithm may be dynamically specified by the key management server in response to a request for encryption. In an example, the encryption algorithm identifier is received by a key broker server (e.g., the key broker server 410) and relayed to a first server (e.g., the media server 402, the media server 404, or the calendar server 406) that will perform the encryption.

At 904, the technique 900 includes selecting an encryption algorithm to be applied with the plaintext key based on the encryption algorithm identifier. In an example, the encryption algorithm is selected by a first server (e.g., the media server 402, the media server 404, or the calendar server 406) that will perform the encryption.

At 906, the technique 900 includes receiving a destination address from the key management server. For example, the destination address may be an address associated with a particular database or file server with technical parameters that has been selected and provisioned for a customer. The destination address may include a network address or URL and or a file path or database key value.

At 908, the technique 900 includes storing the encrypted key and data encrypted with the plaintext key in non-volatile memory at the destination address.

FIG. 10 is a flowchart of an example of a technique 1000 for provisioning a key management server for generating data encryption keys a group of users. The technique 1000 can be executed using computing devices, such as the systems, hardware, and software described with respect to FIGS. 1-6. The technique 1000 can be performed, for example, by executing a machine-readable program or other computer-executable instructions, such as routines, instructions, programs, or other code. The steps, or operations, of the technique 1000 or another technique, method, process, or algorithm described in connection with the implementations disclosed herein can be implemented directly in hardware, firmware, software executed by hardware, circuitry, or a combination thereof.

For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, the technique 1000 includes configuring the key management server to generate data keys. A customer may request for a software platform (e.g., a UCaaS platform) to establish a key management server specific to the customer on behalf of the customer. In some implementations, configuring the key management server includes setting an AWS IAM policy in the key management server.

At 1004, the technique 1000 includes associating the key management server with a group of one or more users. The security policy implemented by the key management server may relate to identities including one or more users of the software platform (e.g., a UCaaS platform) associated with the customer. In some implementations, users are associated with an AWS IAM identity (e.g., a user, a group of users, or a role). For example, the association may be established as part of the customer configurations 320.

Figure 11:
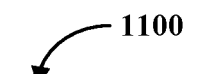
FIG. 11 is a flowchart of an example of a technique for selecting a key management server to supply a data encryption key based on multiple factors.

FIG. 11 is a flowchart of an example of a technique 1100 for selecting a key management server to supply a data encryption key based on a variety of factors. The technique 1100 can be executed using computing devices, such as the systems, hardware, and software described with respect to FIGS. 1-6. The technique 1100 can be performed, for example, by executing a machine-readable program or other computer-executable instructions, such as routines, instructions, programs, or other code. The steps, or operations, of the technique 1100 or another technique, method, process, or algorithm described in connection with the implementations disclosed herein can be implemented directly in hardware, firmware, software executed by hardware, circuitry, or a combination thereof.

For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, the technique 1100 includes selecting the key management server based on an indication, included in the encryption request, of a type of data (e.g., a webinar recording versus a voicemail) to be encrypted. In some implementations, the indication of type of data is a number that is mapped to one of a set of available data types in a software platform (e.g., a UCaaS platform). For example, the set of available data types may include conference, webinar, phone call, voicemail, calendar, calendar token, virtual whiteboards, chat, chat file transfer (e.g., including image sharing), archiving (e.g., archiving for conference, webinar, and phone), SMS, dashboard and reports (e.g., dashboard for conference, webinar, and phone), and transcripts (e.g., transcripts for conference, webinar, and phone).

At 1104, the technique 1100 includes selecting the key management server based on an indication, included in the encryption request, of a geographic region associated with data to be encrypted. In some implementations, the indication of the geographic region is an internet protocol address. In some implementations, the indication of the geographic region is a set of geolocation coordinates. In some implementations, the indication of the geographic region is part of a mailing address associated with a user associated with the data to be encrypted. In some implementations, the indication of the geographic region is a telephone number associated with the data to be encrypted.

FIG. 12 is a flowchart of an example of a technique 1200 for encrypting data using multiple data encryption keys provided by different key management servers. The technique 1200 can be executed using computing devices, such as the systems, hardware, and software described with respect to FIGS. 1-6. The technique 1200 can be performed, for example, by executing a machine-readable program or other computer-executable instructions, such as routines, instructions, programs, or other code. The steps, or operations, of the technique 1200 or another technique, method, process, or algorithm described in connection with the implementations disclosed herein can be implemented directly in hardware, firmware, software executed by hardware, circuitry, or a combination thereof.

For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1204, the technique 1200 includes selecting a second key management server based on the identifier. In some implementations, the second key management server is associated with a different customer than the first key management server. For example, encryption using multiple data encryption keys controlled by multiple respective customers may enable equitable sharing of data between different groups of users associated with different customers that are collaborating. In an example, a conference between one or more users associated with a first customer and one or more users associated with a second customer may be recorded and the recording may need to be encrypted. In this example, two key management servers that are respectively associated with the first customer and the second customer may be selected to provide data encryption keys. The recording of the conference may then be encrypted with both a first data key from the first key management server and with a second data key from the second key management server. The resulting encrypted data may be stored with encrypted copies of the keys used to encrypt the data, which have been encrypted by these respective key management servers. After the plain text versions of these keys have been deleted from the software platform, decrypting this shared data may require permission from all of the respective key management servers. For example, the recording of the conference may be sequentially encrypted with each of the multiple data encryption keys used.

At 1206, the technique 1200 includes transmitting a request for a data encryption key to the second key management server. In some implementations, the request includes identifying information for a user or group of users associated with a security policy implemented by the second key management server, such as an AWS IAM policy. For example, the request may include an AWS IAM identity (e.g., user, group of users, or role). In some implementations, the request is for an envelope encryption key. In one example, the encryption request may be transmitted using a network interface (e.g., the network interface 214) of a key broker server (e.g., the key broker server 410).

At 1208, the technique 1200 includes receiving a second plaintext key and a second encrypted key from the second key management server. The second plaintext key may be a data encryption key that can be directly used to encrypt data using an encryption algorithm. The second plaintext key may be a symmetric key that can be used to both encrypt and to decrypt data. In some implementations, the second plaintext key may be an asymmetric key that can be used for encryption and is paired with another key for decryption. The second key management server may use a CMK to encrypt the second plaintext key. In some implementations, the second plaintext key is a data key that is unique to the communications data to be encrypted. The second encrypted key is an encrypted version of the second plaintext key. The second encrypted key has been encrypted with a separate encryption key retained by the second key management server. Thus, the second key management server may retain the capability to prevent decryption of the encrypted data later using the second encrypted key, after the second plaintext key has been deleted. In some implementations, the encryption algorithm is implied or has been previously specified by communications separate from the request and its response. In some implementations, the encryption algorithm to be used with the second plaintext key is dynamically specified by the second key management server in response to the request. In some examples, an encryption algorithm identifier is received from the second key management server and an encryption algorithm to be applied with the second plaintext key is selected based on the encryption algorithm identifier. The technique 1200 may include implementing the technique 900 of FIG. 9. In one example, the plaintext key and the encrypted key may be received using a network interface (e.g., the network interface 214) of a key broker server (e.g., the key broker server 410).

At 1210, the technique 1200 includes in response to the encryption request, transmitting the second plaintext key and the second encrypted key to the first server. In some implementations, the second plaintext key and the second encrypted key are relayed to the first server, which will perform the encryption of the communications data, along with other data from the second key management server specifying how the data should be encrypted and stored, such as an encryption algorithm identifier and/or a destination address for the encrypted data. In one example, the second plaintext key and the second encrypted key may be transmitted using a network interface (e.g., the network interface 214) of a key broker server (e.g., the key broker server 410).

At 1212, the technique 1200 includes encrypting data accessed by the first server using the first plaintext key and using the second plaintext key to obtain an encrypted data. The data to be encrypted may be of various types of data recorded or maintained in the software platform (e.g., a UCaaS platform). In some implementations, the technique 1200 includes encrypting a recording of a conference conducted by the first server using the first plaintext key and the second plaintext key to obtain an encrypted recording. In some implementations, the technique 1200 includes encrypting a recording of a phone call conducted by the first server using the first plaintext key and the second plaintext key to obtain an encrypted recording. In some implementations, the technique 1200 includes encrypting a voicemail received by the first server using the first plaintext key and the second plaintext key to obtain an encrypted recording. In some implementations, the technique 1200 includes encrypting a calendar token generated by the first server using the first plaintext key and the second plaintext key to obtain an encrypted token. In some implementations, the technique 1200 includes encrypting a recording of a webinar conducted by the first server using the first plaintext key and the second plaintext key to obtain an encrypted recording. In some implementations, the data may be encrypted using an encryption algorithm (e.g., AES-256 GCM) specified by an encryption algorithm identifier from the second key management server. In some implementations, the data accessed by the first server may be sequentially encrypted with each of the multiple data encryption keys used. For example, the data accessed by the first server may be encrypted with the first plaintext key and then the result may be again encrypted using the second plaintext key to obtain the fully encrypted data, where two encryption keys are used. More than two encryption keys may be used to encrypt the data.

At 1214, the technique 1200 includes storing the encrypted data with the first encrypted key and the second encrypted key in non-volatile memory (e.g., a hard drive or flash memory). The encrypted data may be of various types. For example, the technique 1200 may include storing the encrypted recording (e.g., of a conference, a webinar, a phone call, or a voicemail) with the first encrypted key and the second encrypted key in non-volatile memory. For example, the technique 1200 may include storing the encrypted token (e.g., a calendar token) with the first encrypted key and the second encrypted key in non-volatile memory. In some implementations, the encrypted data may be stored in a database or a file server (e.g., the database server 110) by the first server (e.g., the telephony server 112, the media server 402, the media server 404, or the calendar server 406).

At 1216, the technique 1200 includes deleting the second plaintext key. The second plaintext key may be deleted from the software platform (e.g., a UCaaS platform) altogether. The second plaintext key may be deleted by a key broker server that relayed the second plaintext key and by the first server that used the second plaintext key to perform the encryption. Deleting the second plaintext key may help to prevent the encrypted data from being accessed in the future without permission from a key management server of the customer associated with the second key management server.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:
receiving an encryption request from a first server that includes an identifier for one or more users, wherein the identifier includes at least one of a customer identification number, a host email address, or a telephone number;
selecting a key management server based on the identifier;
transmitting a request for a data encryption key to the selected key management server;
receiving a plaintext key and an encrypted key from the key management server;
in response to the encryption request, transmitting the plaintext key and the encrypted key to the first server; and
deleting the plaintext key.

2. The method of claim 1, comprising:
encrypting a recording of a conference conducted by the first server using the plaintext key to obtain an encrypted recording; and
storing the encrypted recording with the encrypted key in non-volatile memory.

3. The method of claim 1, comprising:
encrypting a recording of a phone call conducted by the first server using the plaintext key to obtain an encrypted recording; and
storing the encrypted recording with the encrypted key in non-volatile memory.

4. The method of claim 1, comprising:
encrypting a voicemail received by the first server using the plaintext key to obtain an encrypted recording; and
storing the encrypted recording with the encrypted key in non-volatile memory.

5. The method of claim 1, comprising:
encrypting a calendar token generated by the first server using the plaintext key to obtain an encrypted token; and
storing the encrypted token with the encrypted key in non-volatile memory.

6. The method of claim 1, comprising:
encrypting a recording of a webinar conducted by the first server using the plaintext key to obtain an encrypted recording; and
storing the encrypted recording with the encrypted key in non-volatile memory.

7. The method of claim 1, comprising:
configuring the key management server to generate data keys; and
associating the key management server with a group of one or more users.

8. The method of claim 1, comprising:
receiving an encryption algorithm identifier from the key management server; and
selecting an encryption algorithm to be applied with the plaintext key based on the encryption algorithm identifier.

9. The method of claim 1, comprising:
receiving a destination address from the key management server; and
storing the encrypted key and data encrypted with the plaintext key in non-volatile memory at the destination address.

10. The method of claim 1, wherein the first server is a media server configured to host conference software.

11. The method of claim 1, wherein the first server is part of a UCaaS system configured to support multiple modes of communication via one or more electronic communications networks.

12. The method of claim 1, wherein selecting the key management server comprises:
selecting the key management server based on an indication, included in the encryption request, of a type of data to be encrypted.

13. The method of claim 1, wherein selecting the key management server comprises:
selecting the key management server based on an indication, included in the encryption request, of a geographic region associated with data to be encrypted.

14. The method of claim 13, wherein the indication of the geographic region is an internet protocol address.

15. The method of claim 1, wherein the key management server is a first key management server, the plaintext key is a first plaintext key, and the encrypted key is a first encrypted key, comprising:
selecting a second key management server based on the identifier;
transmitting a request for a data encryption key to the second key management server;
receiving a second plaintext key and a second encrypted key from the second key management server;
in response to the encryption request, transmitting the second plaintext key and the second encrypted key to the first server;
encrypting data accessed by the first server using the first plaintext key and using the second plaintext key to obtain an encrypted data; and
storing the encrypted data with the first encrypted key and the second encrypted key in non-volatile memory; and
deleting the second plaintext key.

16. A system comprising:
a network interface,
a processor, and
a memory, wherein the memory stores instructions executable by the processor to:
receive an encryption request from a first server that includes an identifier for one or more users, wherein the identifier includes at least one of a customer identification number, a host email address, or a telephone number;

select a key management server based on the identifier;

transmit, using the network interface, a request for a data encryption key to the selected key management server;

receive, using the network interface, a plaintext key and an encrypted key from the key management server;

in response to the encryption request, transmit the plaintext key and the encrypted key to the first server; and delete the plaintext key.

17. The system of claim 16, wherein the first server is configured to:

encrypt a recording of a conference conducted by the first server using the plaintext key to obtain an encrypted recording; and store the encrypted recording with the encrypted key in non-volatile memory.

18. The system of claim 16, wherein the memory stores instructions executable by the processor to:

receive, using the network interface, a destination address from the key management server; and store the encrypted key and data encrypted with the plaintext key in non-volatile memory at the destination address.

19. A method comprising:

receiving a decryption request from a first server that includes an identifier for one or more users and an encrypted key, wherein the identifier includes at least one of a customer identification number, a host email address, or a telephone number;

selecting a key management server based on the identifier;

transmitting a request for a data encryption key to the selected key management server, wherein the request includes the encrypted key;

receiving a plaintext key from the key management server;

in response to the decryption request, transmitting the plaintext key to the first server; and deleting the plaintext key.

20. The method of claim 19, comprising:

decrypting an encrypted recording of a conference conducted by the first server using the plaintext key to obtain a decrypted recording.

\* \* \* \* \*